(12) United States Patent
Rouleau et al.

(10) Patent No.: US 9,335,971 B1
(45) Date of Patent: May 10, 2016

(54) HIGH ENTROPY RANDOM BIT SOURCE

(75) Inventors: Gordon Rouleau, Rosemere (CA);
Amir Arab, Montreal (CA)

(73) Assignee: CalAmp Corp., Oxnard, CA (US)

( * ) Notice: Subject to any disclaimer, the term of this patent is extended or adjusted under 35 U.S.C. 154(b) by 1580 days.

(21) Appl. No.: 12/380,507

(22) Filed: Feb. 27, 2009

(51) Int. Cl.
*G06F 7/58* (2006.01)

(52) U.S. Cl.
CPC ...................................... *G06F 7/582* (2013.01)

(58) Field of Classification Search
None
See application file for complete search history.

(56) References Cited

U.S. PATENT DOCUMENTS

| | | | |
|---|---|---|---|
| 4,694,412 A * | 9/1987 | Domenik et al. | 708/251 |
| 5,961,577 A * | 10/1999 | Soenen et al. | 708/251 |
| 6,065,029 A * | 5/2000 | Weiss | 708/251 |
| 6,667,665 B2 * | 12/2003 | Janssen | 331/78 |
| 6,862,605 B2 * | 3/2005 | Wilber | 708/255 |
| 6,886,023 B2 * | 4/2005 | Lundberg | 708/251 |
| 6,954,770 B1 * | 10/2005 | Carlson et al. | 708/251 |
| 7,177,888 B2 * | 2/2007 | Wells | 708/3 |
| 7,587,439 B1 * | 9/2009 | Onufryk et al. | 708/250 |
| 2002/0186086 A1 * | 12/2002 | Curiger et al. | 331/78 |
| 2003/0014452 A1 * | 1/2003 | Le Quere | 708/250 |
| 2004/0103131 A1 * | 5/2004 | Henry et al. | 708/250 |
| 2004/0264233 A1 * | 12/2004 | Fukushima et al. | 365/145 |
| 2007/0043797 A1 * | 2/2007 | Luzzi et al. | 708/250 |
| 2008/0107154 A1 * | 5/2008 | Hsiao-Chyi | 375/130 |
| 2009/0327381 A1 * | 12/2009 | Morad | 708/252 |

* cited by examiner

*Primary Examiner* — Lewis A Bullock, Jr.
*Assistant Examiner* — Christine Dang
(74) *Attorney, Agent, or Firm* — KPPB LLP

(57) ABSTRACT

Systems and methods of generating a highly random bit are provided. Two nearly uncoupled clocks are utilized to generate a near-random bit. Even/Odd sampling at a variable rate is provided to condition many near-random bits to yield a single bit with a value of one or zero 50% of the time.

22 Claims, 8 Drawing Sheets
(2 of 8 Drawing Sheet(s) Filed in Color)

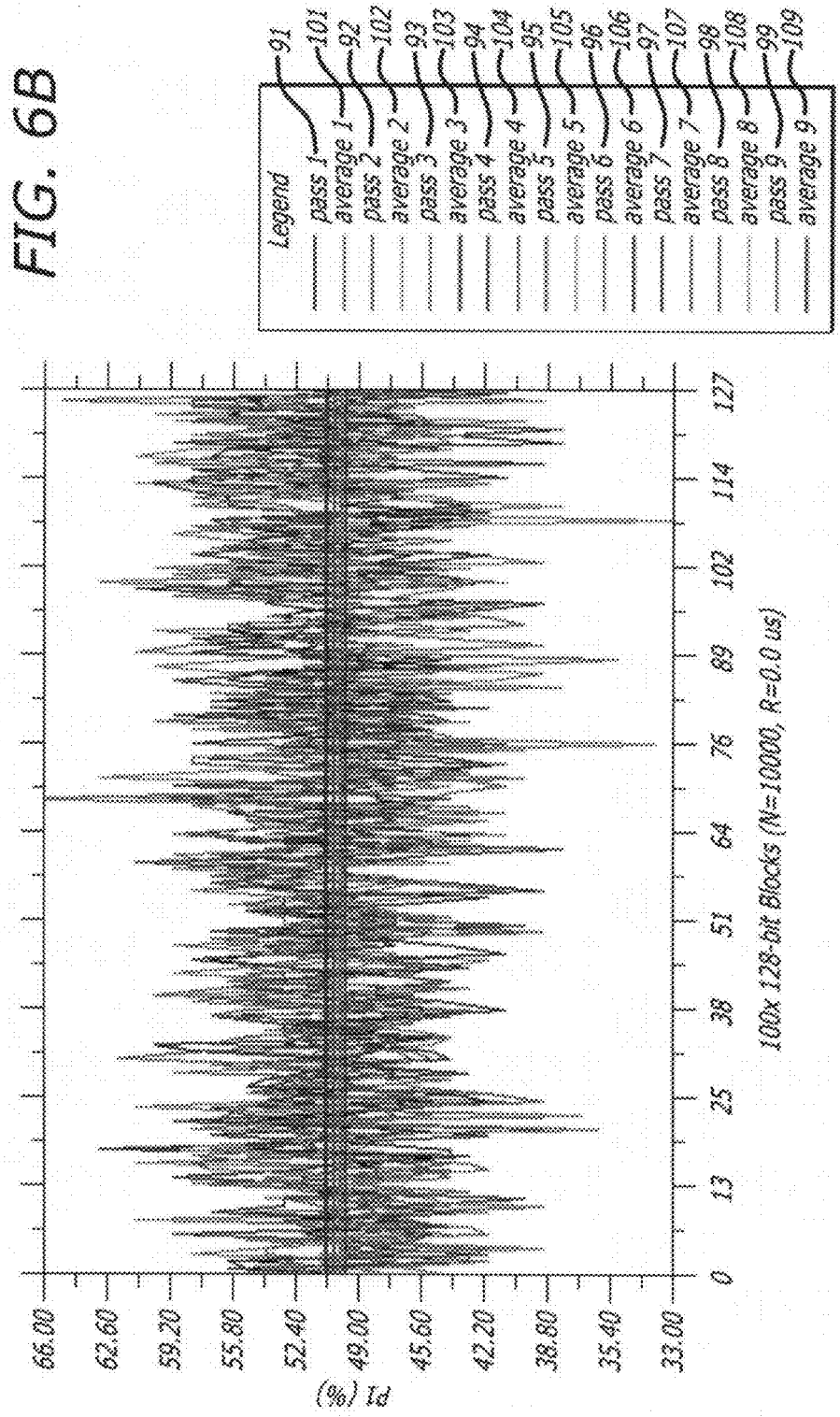

HIGH ENTROPY RANDOM BIT SOURCE

BACKGROUND

The present invention relates generally to random number generators and in particular to random bit source generators with bit conditioning.

The electronic generation of highly random numbers for cryptographic, simulation, or gaming applications largely depends on a sampled electronic bit source. An ideal random digital bit source yields only two values and should do so with exactly 50% probability that the value generated is a "0" or a "1". Traditional true random generators rely on electrical noise generated by circuits. The simplest circuit uses a biased "noise" diode. The AC noise is amplified and converted into a digital number using an analog to digital converter. The result is a random source that may show a non-uniform probability distribution.

Conceptually, it also possible to amplify the "thermal noise" across a high value resistor, and convert this into a digital number. These random generation techniques are somewhat costly to implement, and need be tested and verified in temperature. They require amongst other constraints that the amplifier does not clip, otherwise the random quality is severely degraded.

Accordingly, there is a need to provide a random number generator that effectively ensures a 50% 0/1 probability for a plurality of bits while overcoming the obstacles and shortcomings previously noted and recognized in the art.

SUMMARY

Generally, an external complex programmable logic device (CPLD) or field-programmable gate array (FPGA) implementing a high-entropy bit source is used to generate bit blocks of up to 1024 bits as seeds for 512-bit random key generation, however, this method can be used to generate any size of random numbers at the ratio of number-of-seed-bits divided by 2. In one embodiment, bit conditioning via variable-rate even/odd parallel sampling is performed by software accessing the entropy source to reduce harmonics in the sampled data that may be created by coupling between the processor's clocks and clocks used to generate the random bit.

In one embodiment, a random number generator comprises a high entropy bit source generating a random bit and a processor sampling the bit a plurality of times to generate a random bit block whose bits have an equal probability of being a one or a zero.

In another embodiment, a random number generator comprises clock circuitry including two nearly uncoupled clock sources to generate a random bit and memory coupled to the clock circuitry and storing a plurality of random bits from the clock circuitry. The random number generator also comprises a processor coupled to the memory and sampling each random bit stored in the memory a plurality of times.

In one embodiment, a method of generating a random number comprises generating a clock source from two different clock sources; sampling the generated clock source to generate a random bit; storing the random bit into memory; incrementing each bit counter for each stored random bit corresponding to a one; and setting each output random bit to a one for each bit counter that corresponds to a predetermined value.

The aforementioned and other features of this invention and the manner of obtaining and using them will become more apparent, and will be best understood, by reference to the following description, taken in conjunction with the accompanying drawings. The drawings depict only typical embodiments of the invention and therefore do not limit its scope.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 6A-B are exemplary graphical representations of the randomness of the random bit value as sampled in accordance with various embodiments of the invention.

DETAILED DESCRIPTION

Random Number Generators (RNG) in accordance with embodiments of the invention are systems that generate random sequences of a predetermined number of bits. The sequences can be considered random, because the probability of each bit in any given sequence being a '0' or '1' is near 50%. In addition, each possible sequence is equally likely. In a number of embodiments, the RNGs use circuitry to generate a bit sequence and bit conditioning processes to modify the bit sequences to provide near 50% probability for the likelihood of any given bit being a '0' or '1'. The conditioning processes also modify the bits of each sequence as needed so that each possible sequence of bits is equally likely or very close to being equally likely. In several embodiments, the circuitry uses oscillator-driven clocks to generate each bit sequence. In many embodiments, the bit conditioning processes involve sampling a specific number of high entropy bits at a specific or variable rate to form a sequence, and using predetermined criteria for determining the final bit value included in an output random bit block.

In a number of embodiments, Random Number Generators are used in Encryption Key Generation systems that use random bit blocks generated by a high-entropy bit source as a seed for a Deterministic Random Bit Generator (DRBG). In many instances, the randomness of the seed, i.e., the quality of the high-entropy source, drives the overall quality of the DRBG. The entropy quality is the combination of the randomness of the external source along with any bit-conditioning employed to ensure the same level of randomness across all entropy bits supplied to the DRBG. In many embodiments, the random number generated by the RNG is provided to a DRBG that uses hash algorithms such as SHA-2 and HMAC, block cipher algorithms such as AES, and/or hard number problems to generate encryption keys. RNGs in accordance with embodiments of the invention can also be utilized in a variety of other applications. Techniques for implementing RNGs are discussed further below.

Figure 1:
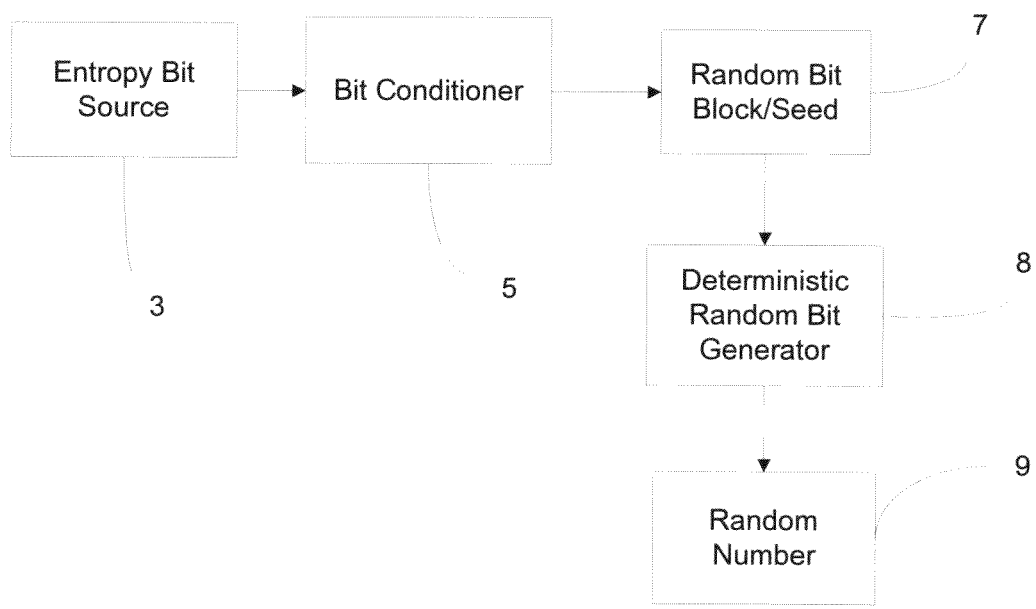
FIG. 1 is a block diagram illustrating a random number generator system in accordance with various embodiments of the invention.

In FIG. 1, a random number generator system is provided. The system includes a single bit entropy source 3 that supplies a high-entropy input to a bit conditioner 5. The bit conditioner stores the conditioned random bit into a storage medium to generate an N-bit random seed 7. The random seed is supplied to a Deterministic RBG 8, which produces one or more random numbers 9 suitable for use as highly random encryption keys.

Random-Bit Source

Figure 2A:
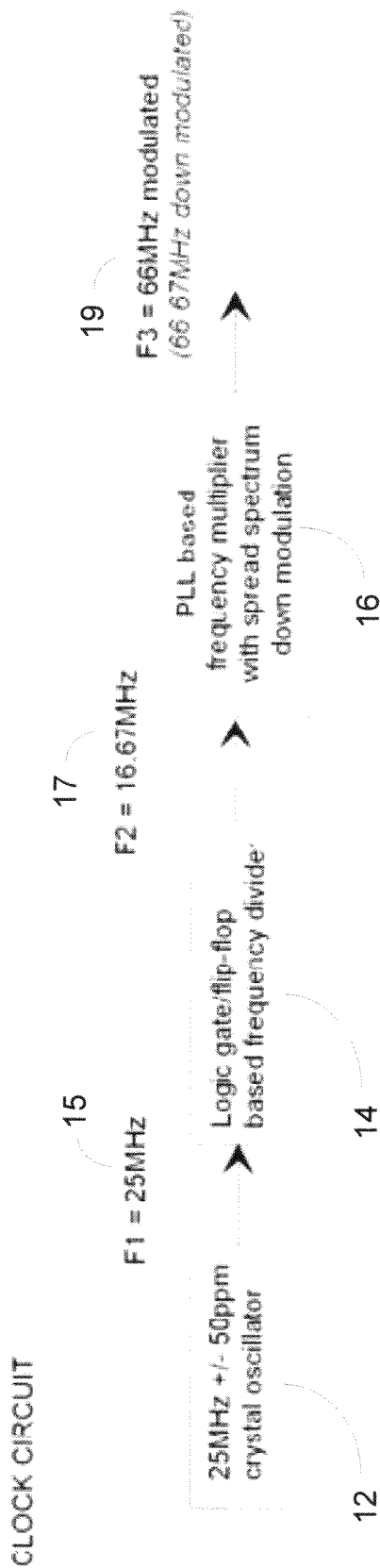
FIGS. 2A-B are semi-schematic diagrams illustrating a random bit source in accordance with various embodiments of the invention.
Figure 2B:
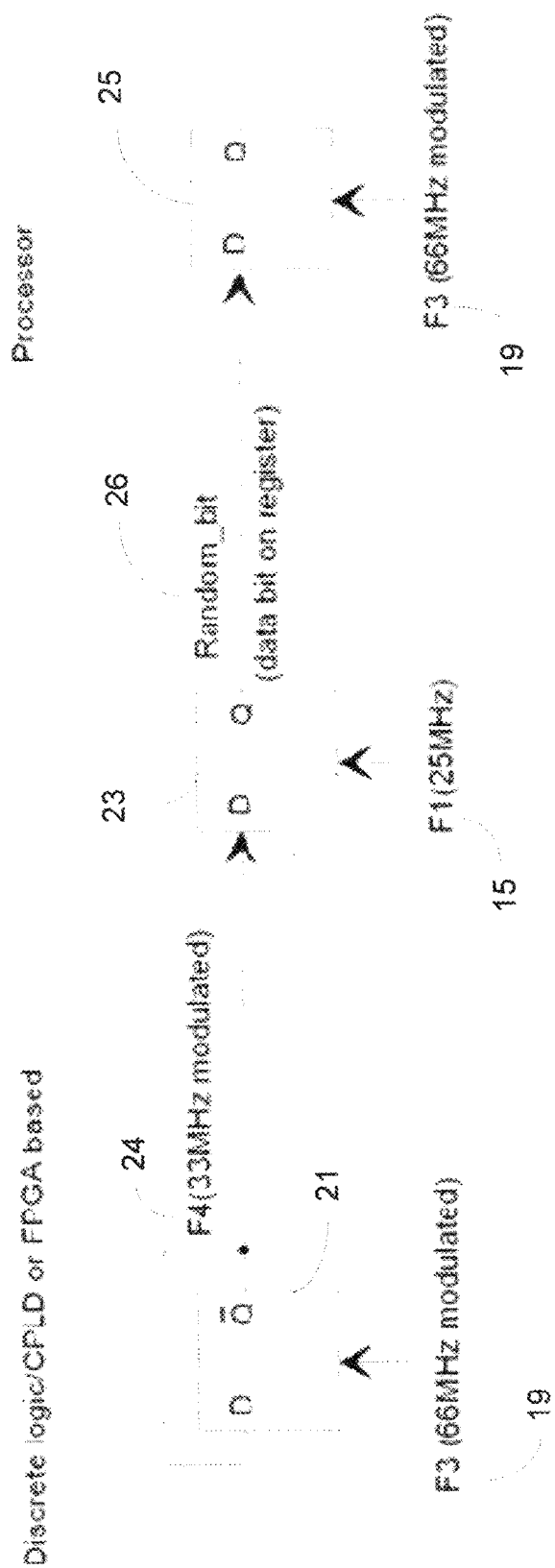

The entropy source 3 generates a random bit based on an inexact relationship between two nearly uncoupled clock signals. Referring now also to FIG. 2, the clock circuit of the entropy source includes an oscillator 12 that generates a first clock signal 15. The oscillator 12, in one embodiment, is a 25 MHz+/−50 ppm crystal oscillator. In one particular embodiment, the oscillator is used to directly synchronize Ethernet transceivers and the start frequency is used to synthesize the processor bus clock frequency (e.g., about 66 MHz modulated).

The first clock signal 15 is supplied to a frequency divider 14. The frequency divider divides the first clock signal 15 by a specified factor, e.g., 1.5, to produce a lowered frequency clock signal 17, e.g., a 16.67 MHz clock signal. The resulting clock signal is fed into a '×4' frequency multiplier PLL 16 having a down-spread-spectrum modulator. The result yields a 66 MHz-modulated clock signal 19. The exact frequency of the 66 MHz modulated clock is difficult to establish, but is approximately 0.4% to 1% lower than the un-modulated ×4 frequency (66.67 MHz). In one embodiment, an exemplary '×4' PLL is manufactured by Cypress under part number CY24814SI or manufactured by IDT under the part number ICS7151MI-40LF.

The PLL 16 being a purely analog circuit with imprecise integrated components (in terms of tolerance, distortion, noise) introduces decoupling between the 16.67 MHz clock and the output frequency (66 MHz). As such, the PLL handles the small level of coupling between the clock signals that could deteriorate the quality of the random source. As noted above, the frequency of the 66 MHz-modulated clock signal can be unstable. With the PLL using down-modulation instead of central modulation for example any harmonic relationships between input and output frequencies are removed. Due to the analog components of the PLL and down modulation being used, the 25 MHz clock signal and the 66 MHz modulated clock signal are considered statistically unrelated, and thus embody two independent clock oscillators.

In order to produce a random bit that can be used by a processor, the first clock signal 15 could be used to sample the 66 MHz modulated clock signal 19 directly. However, since the 66 MHz clock may have a skewed duty cycle as it is sliced by the CPLD input circuit, the result would not yield a near 50% 0/1 bit probability.

The 66 MHz modulated clock signal 19 is therefore supplied to a frequency divider 21 in which the clock is divided by 2 in frequency resulting in a 33 MHz clock signal 24. The 33 MHz clock signal carries the same absolute modulation span in frequency as the 66 MHz clock signal and also has a duty cycle close to 50%.

The 25 MHz clock signal 15 from the oscillator 12 is used to sample the 33 MHz clock signal through a flip-flop 23 to introduce randomness of the sample. Since both clocks are not related with a known deterministic relationship (as noted above with the down-modulation in the PLL being an analog process), their respective phase constantly drift with respect to one another and the 0.4% to 1% modulation implies acceleration and deceleration of that drift, which adds to the randomness of the samples. The sampled 33 MHz clock produces a random bit 26, a bit of "0" or "1", about 50% of the time. Additional randomness is introduced when the processor reads the random bit 26 as it uses its base clock, the 66 MHz modulated clock signal 19 as opposed to the 25 MHz clock signal 15. If the CPLD/FPGA latches the data during the CPU read cycle, additional randomness is introduced when the clock used to latch the data in the CPLD/FPGA at the beginning of a read cycle is the 66 MHz modulated clock signal 19.

The one bit random source relies on physical inaccuracies that exist between two unrelated standard electronic oscillators. For example, a standard low cost quartz oscillator has a typical accuracy range of +/−100 ppm. The exact drift of an oscillator varies from one oscillator to another, varies in temperature and varies as the oscillator ages. Oscillators can also be affected by mechanical acceleration. As such, it is difficult to determine the frequency and/or the phase of a given oscillator. Utilizing two independent square wave oscillators at two different frequencies, and the rising edge of one to sample the other, the sample is a random source having a probability of being '1' equal to the duty cycle on the sampled clock signal. The duty cycle and thus the probability is set to about 50% by dividing by 2 the sampled clock using a simple flip-flop. Phase noise of the oscillators also emphasizes the random nature of this process.

In one embodiment, the processor, e.g., the CPLD or FPGA, is configured to assign a clock signal to a bit in the memory register of the processor at the rising edge of a separate clock signal. One example of the hardware description language representation used in the random bit generation is "if rising_edge(CLK_50 MHz) then RANDOM<=REF_CLK". The signal RANDOM is assigned to a bit in an N-bit register. The bit is also forced not to change value during a processor read cycle and thus the bit data is effectively protected against set-up and hold times violations.

Sampling the Random Bit Source

The random data bit 26 is directly tied to the input of the memory-mapped register. The main processor samples the random bit by reading a CPLD- or FPGA-based memory-mapped register and masking the desired bit. Flip-flop 25 generally illustrates the read process of the processor. Data at input D is latched at the rising edge of the processor base clock, the 66 MHz modulated clock signal 19. Data at output Q is internal to the processor. In one embodiment, a transparent latch precedes the flip-flop 25 and protects against set-up and hold time violations.

Bit Conditioning

Figure 3:
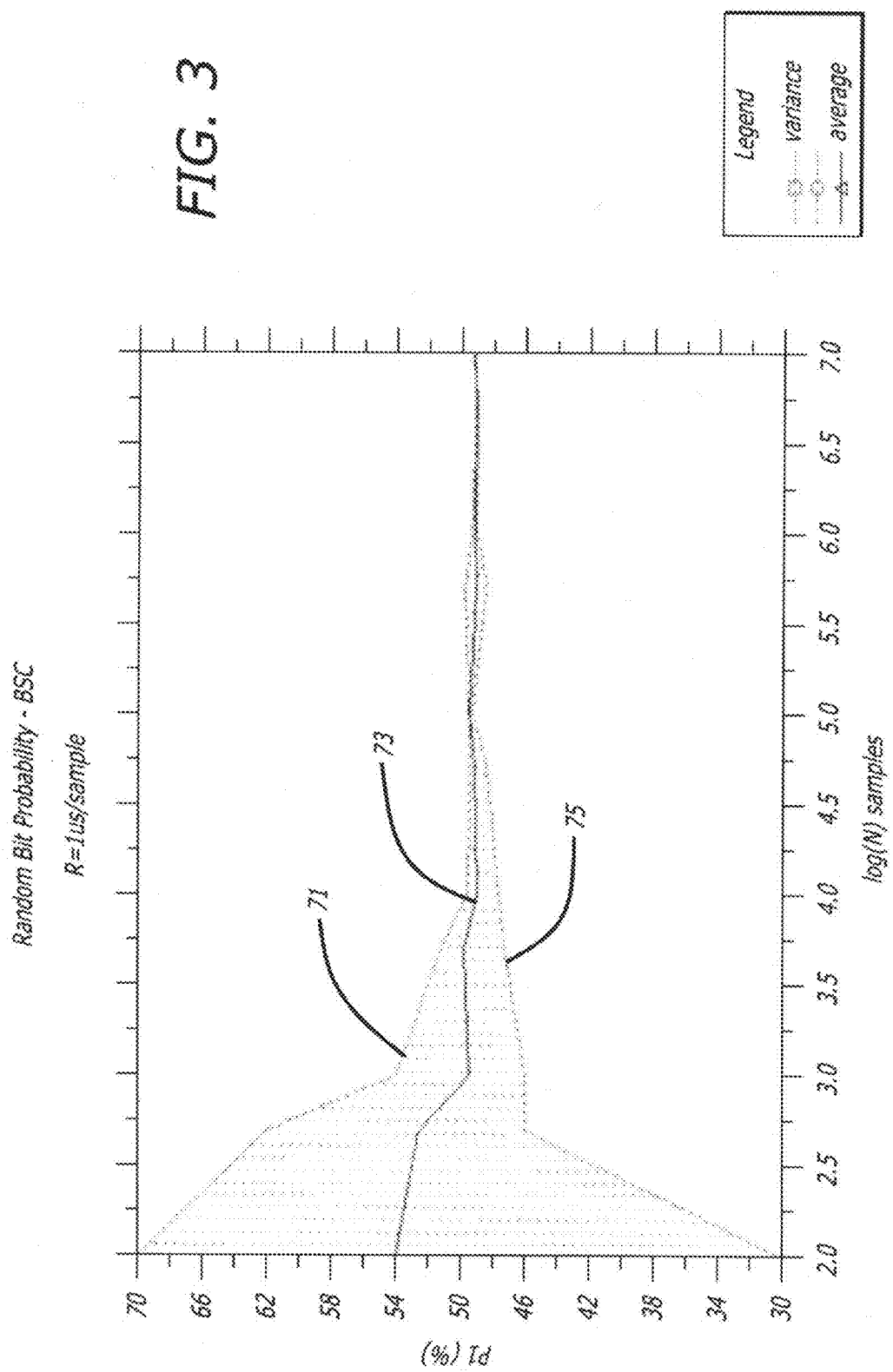
FIG. 3 is an exemplary graphical representation of the randomness of the random bit source sampled in accordance with various embodiments of the invention.

The random bit generator application or processor in one embodiment runs in a preempting task context, and provides bit-conditioning by sampling the above hardware-based random bit source N times at a fixed or variable rate (R) such that the probability that the bit is a '1' (P1) is near 50%. In one embodiment, a user of this generator specifies how many bits to accumulate. Given the two hardware clock signals are very loosely coupled (via the analog ×4 PLL SSDM 16), it is expected that the bit sampled at frequency R has some degree of non-randomness due to harmonics between the F1 and F3 clock frequencies (items 15 and 19 in FIG. 2B). Using approximately N=10000 samples per bit with R=his is an effective tool for conditioning a bit to have a value of a probability of one (P1) near 50%, as shown in FIG. 3. FIG. 3 graphically shows the average of ten iterations of sampling from 10 to 1,000,000 samples of the random bit source with the average probability for yielding a 1 shown by line 73 and variance over the 10 iteration by lines 71, 75. In one embodiment, an entropy source generates a block of X bits for use as either a random number or a seed for a random number generator in a relatively short amount of time. Lower values of R can yield a P1 near 50% with low variation, but this uses higher values for N. In the desired case the sample rate R should be a small variable value and the bit-conditioning process is subject to pre-emption by concurrent processes. The number of samples per bit (N) can change when different clock ratios are used. In one embodiment, more samples per bit are required the closer the clocks are to a common frequency multiplier (for example, the clock sources F1 and F4 at 33 MHz and F3 at 66 MHz would have 33 MHz as the common multiplier). This can be mitigated by using completely decoupled clock sources and/or a variable random bit sampling rate (R).

Figure 4:
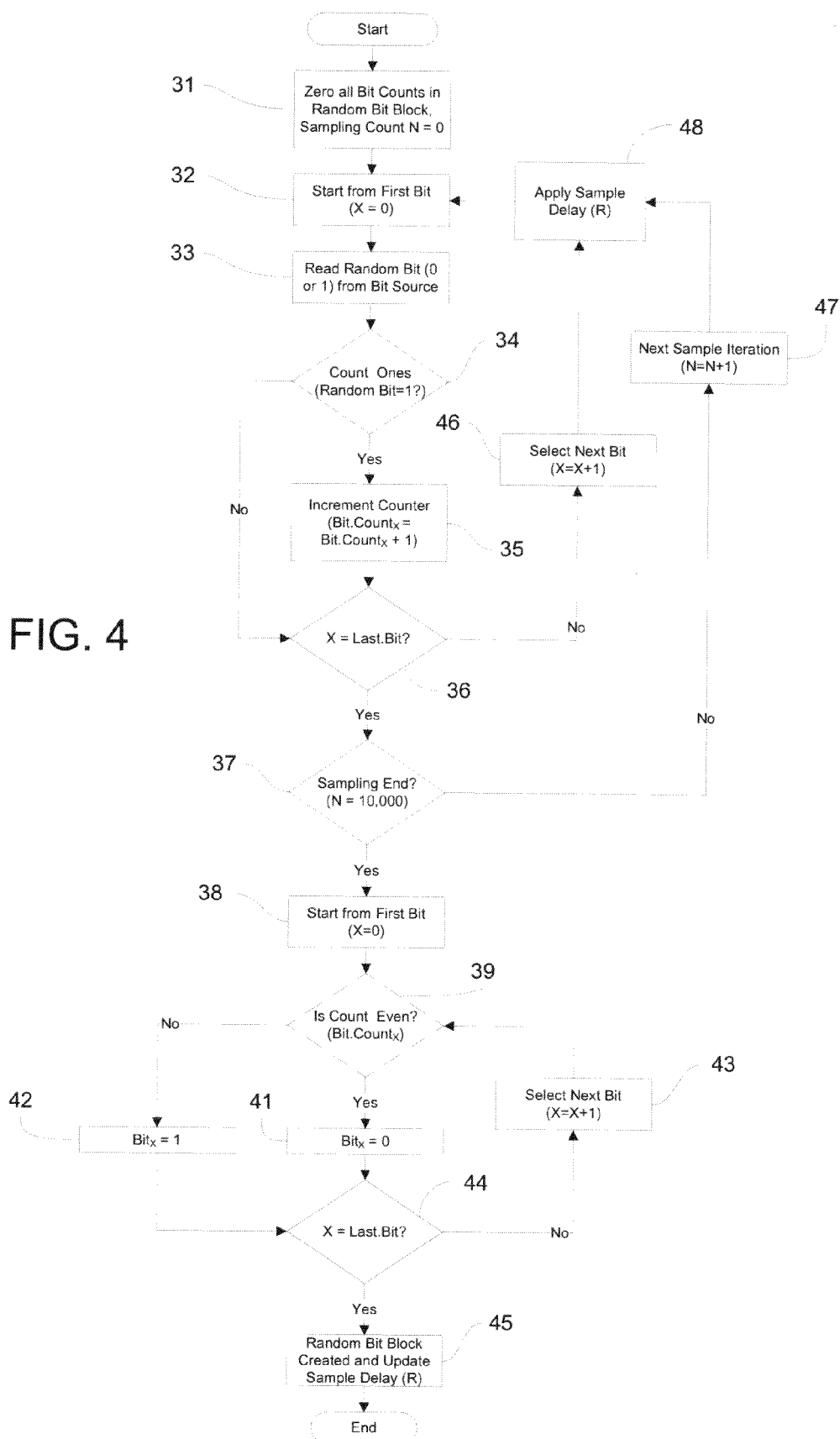
FIG. 4 is a flowchart illustrating a random generator system in accordance with various embodiments of the invention.

Referring now to FIG. 4, an even/odd parallel sampling process for 128 bits is illustrated. The even/odd parallel sampling generally records the 1's of the random bit stored in the random bit register. Initially, the counters for the bits are zeroed and a sampling count is zero (31). The first random bit is read (32) from the bit source (33). If the random bit equals a one, the bit counter for the particular bit, e.g., the first bit, is incremented by one and the next bit is selected (46) and read (33) along with the applying of a sample delay (R) (48). Otherwise, the bit counter is bypassed. If the last bit is reached, e.g., the 128th bit, additional sampling is performed if the sampling end (for example, 10,000 samples) is not reached (37). If the sampling end is not reached, the next sample iteration begins (47) and repeats applying a sample delay (R) (48) and reading the random bit (33).

When the sampling end is reached, the bit counters for the bits are examined. Starting from the first bit (38), the count of each bit counter is identified as even or odd. If the bit counter is even (39), then the bit is set to zero (41). Otherwise, the bit is set to one (42). The examination continues by selecting each bit (43), until the last bit is reached (44). With the setting of the last bit, the random bit block is created (45) that can be used to seed a DBRG. Bits from either the random bit block (45), or from the output of the DBRG can also be used to adjust the value of the sample delay (R) used to generate the next Random Bit block at any time.

Figure 5:
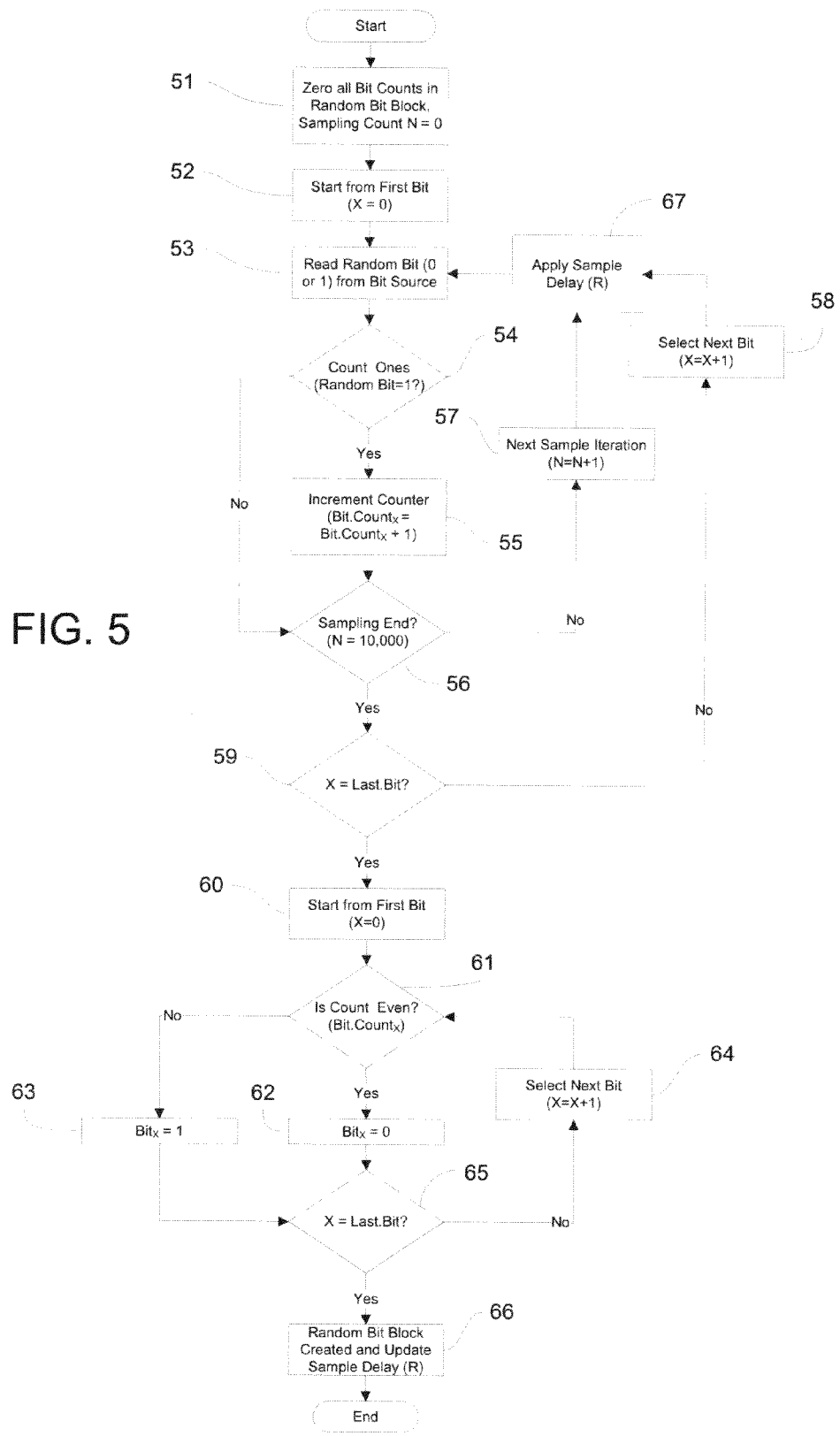
FIG. 5 is a flowchart illustrating a random generator system in accordance with various embodiments of the invention.

FIG. 5 illustrates an even/odd serial sampling process for X-bits (e.g., 128 bits). Similar to parallel sampling, the serial sampling process tracks the one's of the random bits stored in the random bit register. However, the serial sampling samples one bit N number of times before proceeding to the next bit. In particular, the counters for the bits are zeroed and a sampling count is zeroed (51) and the first random bit is sampled (52) and read from the bit source (53). If the random bit equals a one (54), the bit counter for the particular bit, e.g., the first bit, is incremented by one (55). Otherwise, the bit counter is bypassed. Instead of proceeding to the next bit, the next sample iteration begins (57) if the sampling end (e.g., 10,000 samples) is not reached (56). When the sampling end is reached, the next bit is selected (58) unless the last bit is reached (59), e.g., the 128th bit. For each next bit or sample iteration, a sample delay (R) is applied (67).

When the last bit is reached, the bit counters for the bits are examined, starting from the first bit (60). The count of each bit counter is identified as even or odd. If the bit counter is even (61), then the bit is set to zero (62). Otherwise, the bit is set to one (63). The examination continues by selecting each bit (64), until the last bit is reached (65). With the setting of the last bit, the random bit block is created (66) that can be used to seed a DBRG. Bits from either the random bit block (66), or from the output of the DBRG can also be used to adjust the value of R (67) used to generate the next Random Bit block at any time.

Random Bit Block

Figure 6A:
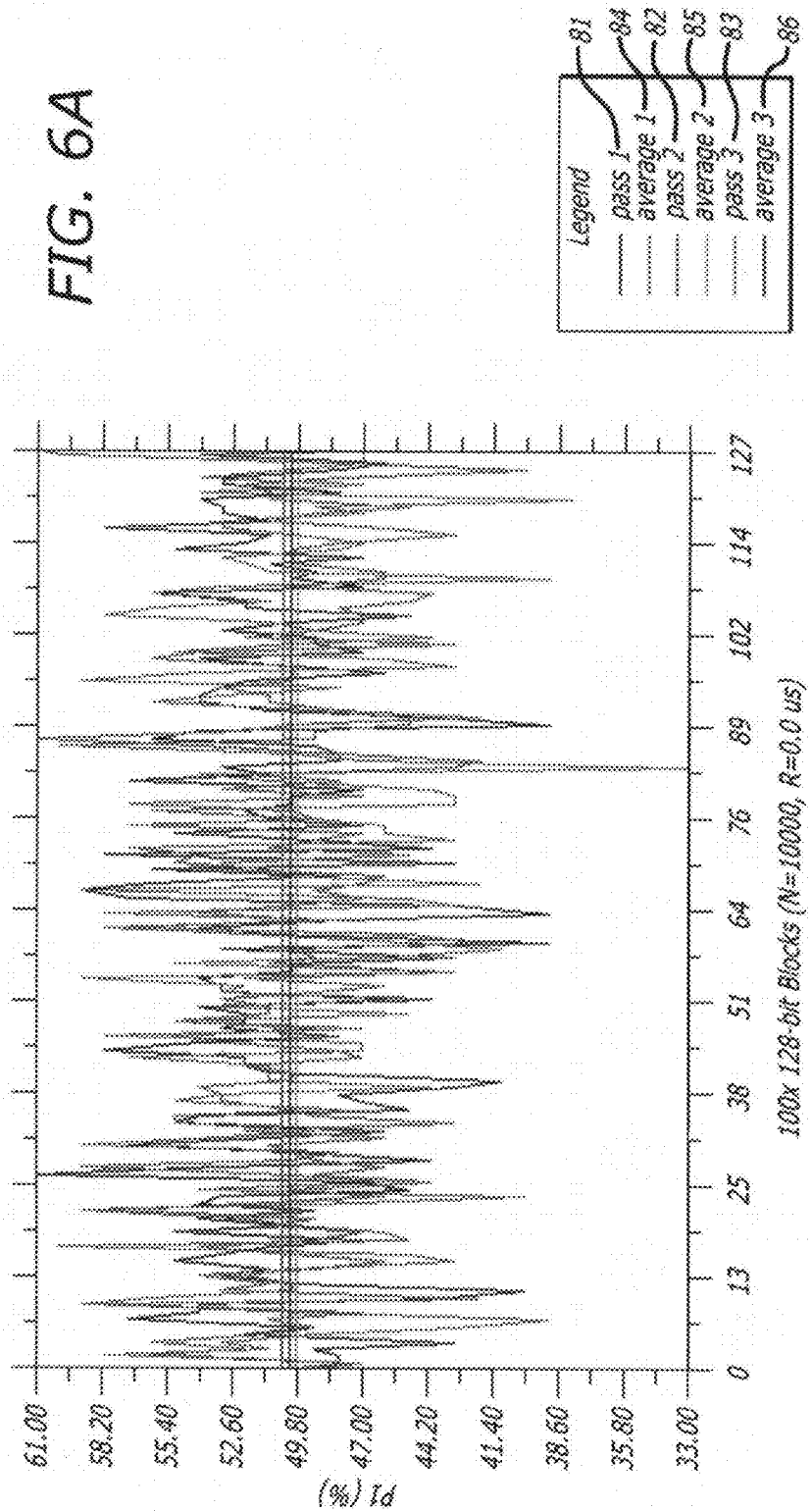

As shown in FIGS. 6A-B, given a constant sampling rate delay R of 0 μs, the value of P1 for each bit of a 128-bit block does not show any discernable pattern across the bits within the range of P1<50±4%. For even/odd sampling, the average probability of P1 across all bits after 100×128 bit block samples is 50% with usually less than 0.5% variation; in other words it can be expected that over time all 128 bits average very close to a 50% probability to be '1'. Parallel even/odd sampling provides an advantage in operational overhead over the serial equivalent by generating the number of bits needed by the application with a single function call, however, either serial or parallel even/odd sampling is useful for generating random bit blocks from the hardware entropy source embodiment. To reduce harmonic patterns arising in the range of P1>50±4%, it is desirable to use bits from the Random Bit block and/or DBRG output to introduce small variations in R. As illustration, three iterations or passes of block sampling are shown in FIG. 6A as lines 81, 82 and 83 and averages as lines 84, 85 and 86. Likewise, nine iterations or passes are shown as lines 91-99 and averages as lines 101-109 in FIG. 6B. The three iterations of 100×128-bit block even/odd serial sampling shows little correlation in P1 across all 128-bits, and is further evident in nine accumulated iterations of 100×128-bit block even/odd parallel sampling.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

The invention claimed is:

1. A random number generator comprising a high entropy bit source, wherein the high entropy bit source generates a random number by:
   obtaining a first clock signal using a clock source;
   frequency dividing the first clock signal to generate a second clock signal using a frequency divider;
   frequency multiplying and down modulating the second clock signal to generate a third clock signal using an analog frequency multiplier phase lock loop;
   generating a random bit using the first clock signal and the third clock signal, wherein the random bit has a value selected from the group consisting of zero and one;
   storing the random bit into a memory;
   incrementing a bit counter for each stored random bit corresponding to a one;
   bypassing the bit counter for each stored random bit corresponding to a zero; and
   setting an output random bit to a one for each bit counter that corresponds to a predetermined value.

2. The random number generator of claim 1 wherein the clock source comprises a crystal oscillator.

3. The random number generator of claim 1 wherein the second clock signal is lower in frequency than the first clock signal.

4. The random number generator of claim 1 wherein the third clock signal is higher in frequency than the first and second clock signals.

5. The random number generator of claim 1 wherein the first clock signal and the third clock signal are statistically unrelated.

6. The random number generator of claim 1 wherein the first clock source is supplied to a latch to sample the third clock signal.

7. The random number generator of claim 1 wherein the third clock signal is supplied to read an output of a latch.

8. The random number generator of claim 1 wherein a processor monitors a total number of times the sampled bit is a one.

9. The random number generator of claim 8 wherein the processor sets the bit to a one based on the total number of times being an odd number.

10. The random number generator of claim 8, wherein:
the memory is coupled to the high entropy bit source and the processor;
the memory stores a plurality of random bits generated using the high entropy bit source; and
the processor samples each random bit stored in the memory at least one time.

11. A method of generating a random number comprising:
obtaining a first clock signal using a single clock source;
frequency dividing the first clock signal to generate a second clock signal using a frequency divider;
frequency multiplying and down modulating the second clock signal to generate a third clock signal using an analog frequency multiplier phase lock loop;
generating a random bit using the first clock signal and the third clock signal, wherein the random bit has a value selected from the group consisting of zero and one;
storing the random bit into a memory;
incrementing a bit counter for each stored random bit corresponding to a one;
bypassing the bit counter for each stored random bit corresponding to a zero; and
setting an output random bit to a one for each bit counter that corresponds to a predetermined value.

12. The method of claim 11 wherein the predetermined value is an odd value.

13. The random number generator of claim 1, wherein the clock source is used to synchronize an Ethernet transceiver.

14. The random number generator of claim 1, wherein the first clock signal has a frequency of 25 MHz.

15. The random number generator of claim 1, wherein the frequency divider divides a signal by a factor of 1.5.

16. The random number generator of claim 1, wherein the second clock signal has a frequency of 16.67 MHz.

17. The random number generator of claim 1, wherein the third clock signal has a frequency of 66 MHz.

18. The random number generator of claim 1, wherein the analog frequency multiplier phase lock loop multiplies a signal by a factor of 4.

19. The random number generator of claim 1, wherein the analog frequency multiplier phase lock loop performs down modulation.

20. The random number generator of claim 1, wherein the high entropy bit source further comprises a second frequency divider and a fourth clock signal;
wherein the second frequency divider divides a signal by a factor of 2; and
wherein the fourth clock signal is derived by dividing the third clock signal using the second frequency divider.

21. The random number generator of claim 20, wherein the high entropy bit source generates a random bit utilizing the first clock signal and the fourth clock signal.

22. The random number generator of claim 1, wherein the random bit is generated based on a phase drift introduced by the analog frequency multiplier phase lock loop.

* * * * *